United States Patent
Rais-Ghasem et al.

(10) Patent No.: US 11,687,801 B2
(45) Date of Patent: Jun. 27, 2023

(54) KNOWLEDGE GRAPH DATA STRUCTURES AND USES THEREOF

(71) Applicant: QLIKTECH INTERNATIONAL AB, Lund (SE)

(72) Inventors: Mohsen Rais-Ghasem, Lund (SE); Tad Adams, Lund (SE)

(73) Assignee: QLIKTECH INTERNATIONAL AB, Lund (SE)

( * ) Notice: Subject to any disclaimer, the term of this patent is extended or adjusted under 35 U.S.C. 154(b) by 961 days.

(21) Appl. No.: 16/392,286

(22) Filed: Apr. 23, 2019

(65) Prior Publication Data

US 2019/0325329 A1 Oct. 24, 2019

Related U.S. Application Data

(60) Provisional application No. 62/661,346, filed on Apr. 23, 2018.

(51) Int. Cl.
*G06N 5/04* (2023.01)
*G06F 16/36* (2019.01)
(Continued)

(52) U.S. Cl.
CPC ............. *G06N 5/04* (2013.01); *G06F 16/325* (2019.01); *G06F 16/328* (2019.01);
(Continued)

(58) Field of Classification Search
None
See application file for complete search history.

(56) References Cited

U.S. PATENT DOCUMENTS 8,909,653 B1 * 12/2014 Su .................. G06N 5/043
707/705
9,208,223 B1 * 12/2015 Patil ................ G06F 16/951
(Continued)

FOREIGN PATENT DOCUMENTS

CN 101681381 A * 3/2010 ........... G06F 16/634
WO WO-2018169795 A1 * 9/2018 ......... G06F 16/2455

OTHER PUBLICATIONS

Benjamin Klöpper et al, "Integrated search for heterogeneous data in process industry applications—A proof of concept." 2016 IEEE 14th International Conference on Industrial Informatics (INDIN). IEEE, 2016. 6 pages. (Year: 2016).*
(Continued)

*Primary Examiner* — Uyen T Le
(74) *Attorney, Agent, or Firm* — Ballard Spahr LLP

(57) ABSTRACT

Methods and systems are disclosed for generating and using a knowledge graph. In an aspect, the knowledge graph may be generated based on data fields for one or more datasets associated with one or more parameters extracted from a group of chart data structures. In another aspect, a query dataset may be analyzed, and one or more query data fields may be extracted from the query dataset. The one or more query data fields may be compared to a knowledge graph stored in a graph database to determine one or more result data fields. A context may be determined for each of the one or more result data fields, and an associated data set may be determined. Based on the context, each of the associated data sets may be scored, and a recommended analysis may be presented to a user.

20 Claims, 10 Drawing Sheets

(51) Int. Cl.
*G06F 16/31* (2019.01)
*G06F 16/35* (2019.01)
*G06N 5/02* (2023.01)

(52) U.S. Cl.
CPC .......... *G06F 16/355* (2019.01); *G06F 16/367* (2019.01); *G06N 5/02* (2013.01)

(56) References Cited

U.S. PATENT DOCUMENTS

| | | | |
|---|---|---|---|
| 9,256,682 B1* | 2/2016 | Li | G06F 16/24578 |
| 2005/0060332 A1 | 3/2005 | Bernstein | |
| 2008/0059486 A1* | 3/2008 | Pappas | G06F 16/2423 |
| 2015/0293904 A1* | 10/2015 | Roberts | G06N 5/02 |
| | | | 704/9 |
| 2016/0328406 A1 | 11/2016 | Convertino | |
| 2016/0371288 A1 | 12/2016 | Le Biannic | |
| 2018/0053096 A1* | 2/2018 | Farrell | G06F 16/9024 |
| 2018/0074786 A1 | 3/2018 | Oberbreckling | |
| 2018/0096077 A1 | 4/2018 | Srivastava | |
| 2018/0121500 A1* | 5/2018 | Reschke | G06F 40/30 |
| 2019/0252074 A1* | 8/2019 | Datla | G06F 17/10 |
| 2021/0227039 A1* | 7/2021 | Mitra | H04L 9/30 |

OTHER PUBLICATIONS

European Search Report dated Aug. 7, 2019 by the European Patent Office for EP Application No. 19170628.2, (Applicant—QlikTech International AB) (11 pages).

Anonymous: "Hash function—Wikipedia", Nov. 19, 2016 (Nov. 19, 2016), XP055841706, Retrieved from the Internet: URL:https://en.wikipedia.org/w/index.php? title=Hash function&oldid=745198457 [retrieved on Sep. 16, 2021].

* cited by examiner

FIG. 4

| Client | Year | Sum (Number * Price) |
|---|---|---|
| Nisse | 1999 | 19.5 |
| Gullan | 1999 | 37.5 |
| Kalle | 1999 | 60 |
| Pekka | <NULL> | 75 |
| <ALL> | 1999 | 117 |
| <ALL> | <NULL> | 75 |
| Nisse | <ALL> | 19.5 |
| Gullan | <ALL> | 37.5 |
| Kalle | <ALL> | 60 |
| Pekka | <ALL> | 75 |
| <ALL> | <ALL> | 192 |

Table 6

Sum (Number * Price) Per Client, Year

|  | 1999 | <NULL> | <ALL> |
|---|---|---|---|
| Nisse | 19.5 |  | 19.5 |
| Gullan | 37.5 |  | 37.5 |
| Kalle | 60 |  | 60 |
| Pekka |  | 75 | 75 |
| <ALL> | 117 | 75 | 192 |

Table 7

KNOWLEDGE GRAPH DATA STRUCTURES AND USES THEREOF

CROSS REFERENCE TO RELATED PATENT APPLICATION

This application claims priority to U.S. application Ser. No. 62/661,346, filed on Apr. 23, 2018, which is herein incorporated by reference in its entirety.

SUMMARY

It is to be understood that both the following general description and the following detailed description are exemplary and explanatory only and are not restrictive, as claimed. Methods and systems are disclosed for generating and using a knowledge graph. In an aspect, one or more parameters may be extracted from a group of chart data structures. Using the one or more parameters, data fields for one or more datasets associated with the parameters may be determined. A knowledge graph may be generated based on the data fields for the one or more datasets. In another aspect, a query dataset may be analyzed, and one or more query data fields may be extracted from the query dataset. The one or more query data fields may be compared to a knowledge graph stored in a graph database to determine one or more result data fields. A context in the knowledge graph may be determined for each of the one or more result data fields, and an associated data set may be determined for each of the one or more result data fields. Based on the context, each of the associated data sets may be scored, and a recommended analysis derived from the associated data sets having a score above a threshold may be presented to a user. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 is a set of tables (Tables 6-7) showing a final data structure, e.g. a multidimensional cube, created by evaluating mathematical functions;

DETAILED DESCRIPTION

Figure 1:
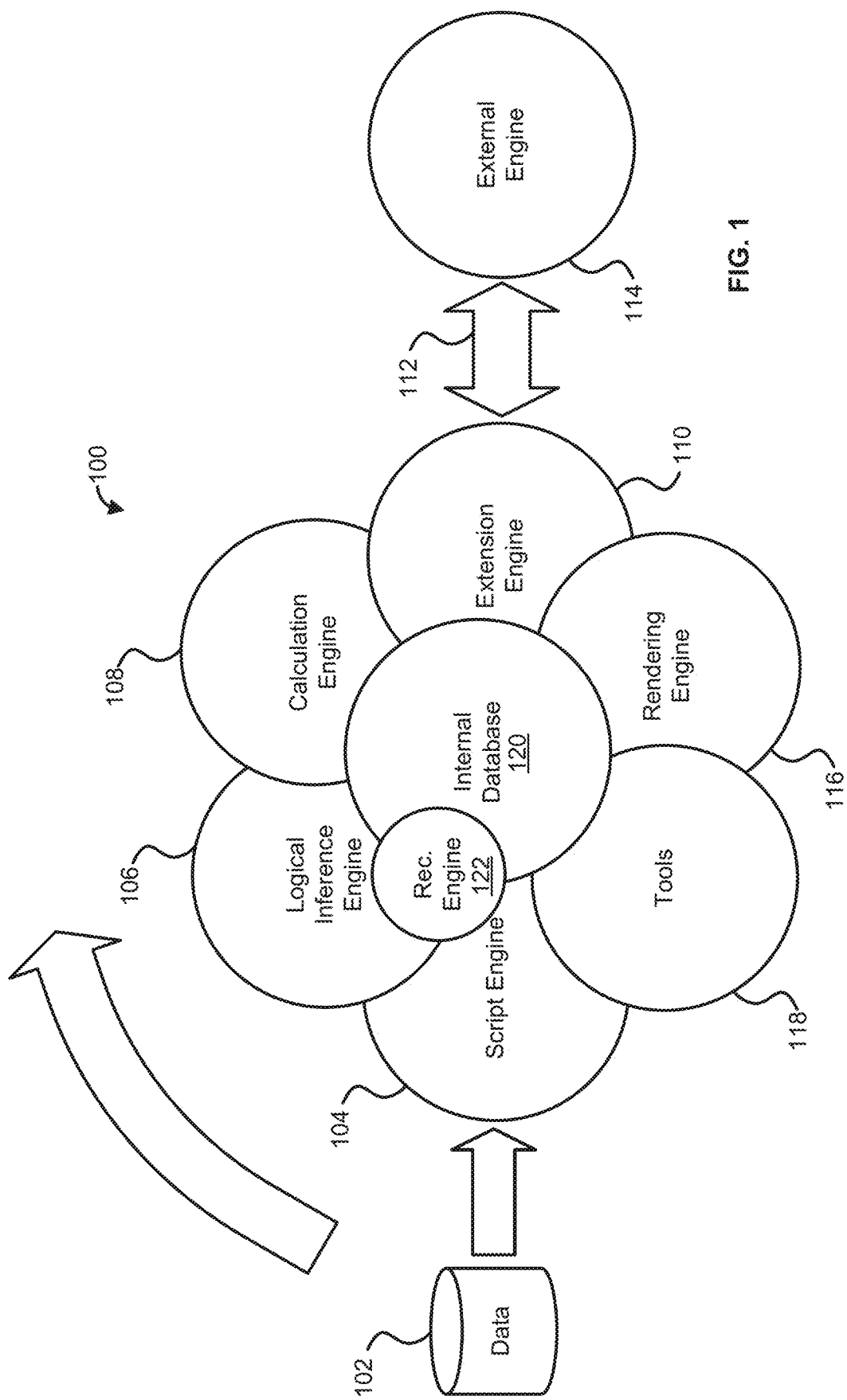
FIG. 1 is a schematic diagram showing an embodiment of a system forming an implementation of the disclosed methods.

Before the present methods and systems are disclosed and described in more detail, it is to be understood that the methods and systems are not limited to specific steps, processes, components, or structure described, or to the order or particular combination of such steps or components as described. It is also to be understood that the terminology used herein is for the purpose of describing exemplary embodiments only and is not intended to be restrictive or limiting.

As used herein the singular forms "a," "an," and "the" include both singular and plural referents unless the context clearly dictates otherwise. Values expressed as approximations, by use of antecedents such as "about" or "approximately," shall include reasonable variations from the referenced values. If such approximate values are included with ranges, not only are the endpoints considered approximations, the magnitude of the range shall also be considered an approximation. Lists are to be considered exemplary and not restricted or limited to the elements comprising the list or to the order in which the elements have been listed unless the context clearly dictates otherwise.

Throughout the specification and claims of this disclosure, the following words have the meaning that is set forth: "comprise" and variations of the word, such as "comprising" and "comprises," mean including but not limited to, and are not intended to exclude, for example, other additives, components, integers or steps. "Exemplary" means "an example of", but not essential, necessary, or restricted or limited to, nor does it convey an indication of a preferred or ideal embodiment. "Include" and variations of the word, such as "including" are not intended to mean something that is restricted or limited to what is indicated as being included, or to exclude what is not indicated. "May" means something that is permissive but not restrictive or limiting. "Optional" or "optionally" means something that may or may not be included without changing the result or what is being described. "Prefer" and variations of the word such as "preferred" or "preferably" mean something that is exemplary and more ideal, but not required. "Such as" means something that is exemplary.

Steps and components described herein as being used to perform the disclosed methods and construct the disclosed systems are exemplary unless the context clearly dictates otherwise. It is to be understood that when combinations, subsets, interactions, groups, etc. of these steps and components are disclosed, that while specific reference of each various individual and collective combinations and permutation of these may not be explicitly disclosed, each is specifically contemplated and described herein, for all methods and systems. This applies to all aspects of this application including, but not limited to, steps in disclosed methods and/or the components disclosed in the systems. Thus, if there are a variety of additional steps that can be performed or components that can be added, it is understood that each of these additional steps can be performed and components added with any specific embodiment or combination of embodiments of the disclosed systems and methods.

The present methods and systems may be understood more readily by reference to the following detailed description of preferred embodiments and the Examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices, whether internal, networked or cloud based.

Embodiments of the methods and systems are described below with reference to diagrams, flowcharts and other illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

FIG. 1 illustrates an associative data indexing engine 100 with data flowing in from the left and operations starting from a script engine 104 and going clockwise (indicated by the clockwise arrow) to export features 118. Data from a data source 102 can be extracted by a script engine 104. The data source 102 can comprise any type of known database, such as relational databases, post-relational databases, object-oriented databases, graph databases, hierarchical databases, flat files, spread sheet, etc. The Internet may also be regarded as a database in the context of the present disclosure. A visual interface can be used as an alternative or combined with a script engine 104. The script engine 104 can read record by record from the data source 102 and data can be stored or appended to symbol and data tables in an internal database 120. Read data can be referred to as a dataset.

Figure 2:
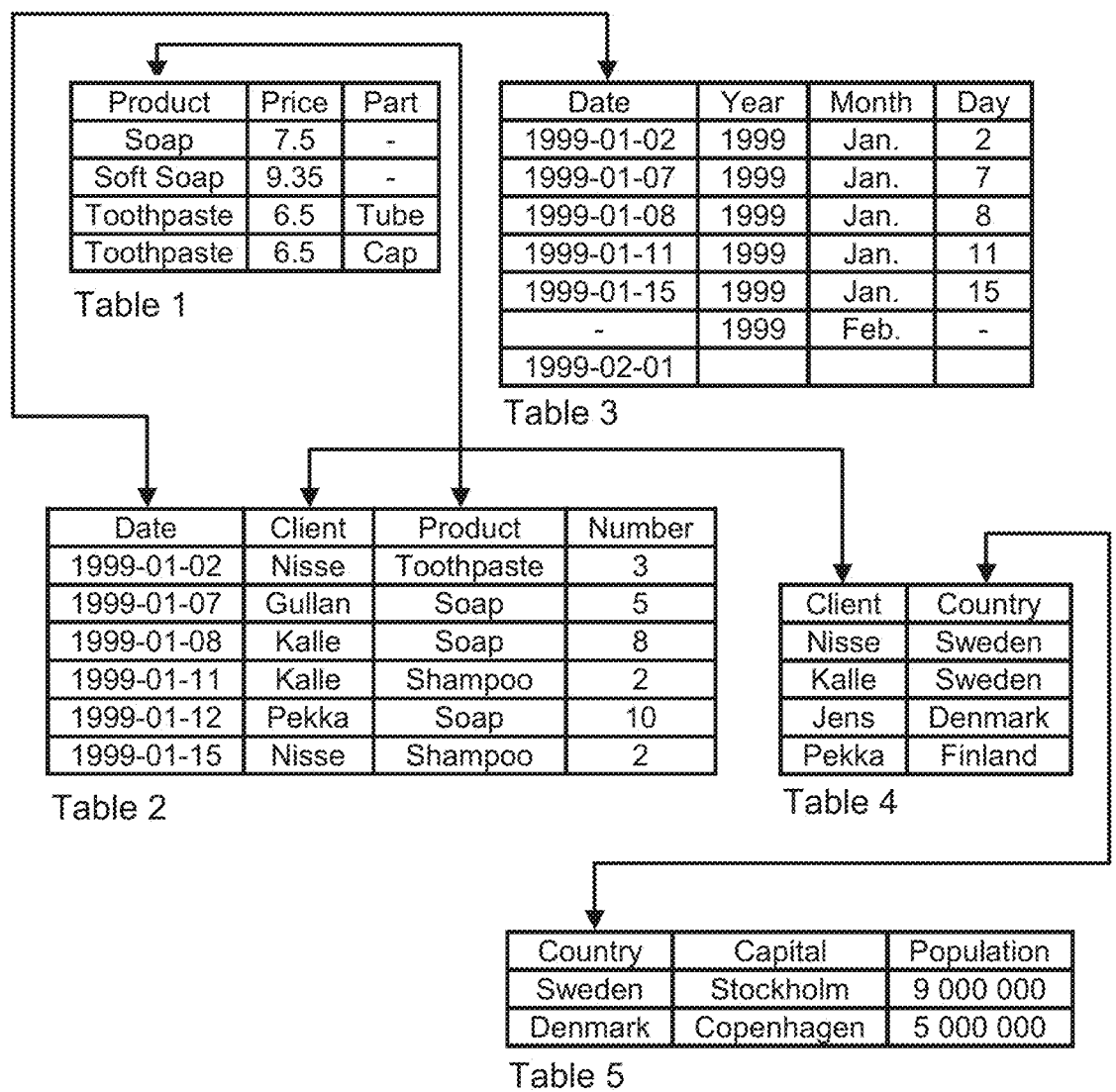
FIG. 2 is a set of tables (Tables 1-5) of a database and associations between variables in the tables.

An example database, as shown in FIG. 2, can comprise a number of data tables (Tables 1-5). Each data table can contain data values of a number of data variables. For example, in Table 1 each data record contains data values of the data variables "Product," "Price," and "Part." If there is no specific value in a field of the data record, this field is considered to hold a NULL-value. Similarly, in Table 2 each data record contains values of the variables "Date," "Client," "Product," and "Number." In Table 3 each data record contains values of variable "Date" as "Year," "Month" and "Day." In Table 4 each data record contains values of variables "Client" and "Country," and in Table 5 each data record contains values of variables "Country," "Capital," and "Population." Typically, the data values are stored in the form of ASCII-coded strings, but can be stored in any form.

Each of the data elements of the database shown in Tables 1-5 of FIG. 2 has a data element type and a data element value (for example "Client" is the data element type and "Nisse" is the data element value). Multiple records can be stored in different database structures such as data cubes, data arrays, data strings, flat files, lists, vectors, and the like; and the number of database structures can be greater than or equal to one and can comprise multiple types and combinations of database structures. While these and other database structures can be used with, and as part of, the methods and systems disclosed, the remaining description will refer to tables, vectors, strings and data cubes solely for convenience.

Additional database structures can be included within the database illustrated as an example herein, with such structures including additional information pertinent to the database such as, in the case of products for example; color, optional packages, etc. Each table can comprise a header row which can identify the various data element types, often referred to as the dimensions or the fields, that are included within the table. Each table can also have one or more additional rows which comprise the various records making up the table. Each of the rows can contain data element values (including null) for the various data element types comprising the record.

Returning to FIG. 1, in an aspect, the extraction of the data can comprise extracting an initial dataset (or scope) from the data source 102, e.g. by reading the initial dataset into the primary memory (e.g. RAM) of the computer. The initial dataset can comprise the entire contents of the data source 102, or a subset thereof. The internal database 120 can comprise the extracted data and/or symbol tables. Symbol tables can be created for each field and, in one aspect, can only contain the distinct field values, each of which can be represented by their clear text meaning and a bit filled pointer. The data tables can contain said bit filled pointers.

In the case of a query of the data source 102, a scope can be defined by the tables included in a SELECT statement (or equivalent) and how these are joined. In an aspect, the SELECT statement can be SQL (Structured Query Language) based. For an Internet search, the scope can be an index of found web pages, for example, organized as one or more tables. A result of scope definition can be a dataset.

Once the data has been extracted, a user interface can be generated to facilitate dynamic display of the data. By way of example, a particular view of a particular dataset or data subset generated for a user can be referred to as a state space or a session. The methods and systems can dynamically generate one or more visual representations of the data to present in the state space.

A user can make a selection in the dataset, causing a logical inference engine 106 to evaluate a number of filters on the dataset. For example, a query on a database that holds data of placed orders, could be requesting results matching an order year of '1999' and a client group be 'Nisse.' The selection may thus be uniquely defined by a list of included fields and, for each field, a list of selected values or, more generally, a condition. Based on the selection, the logical inference engine 106 can generate a data subset that represents a part of the scope. The data subset may thus contain a set of relevant data records from the scope, or a list of references (e.g., indices, pointers, or binary numbers) to these relevant data records. The logical inference engine 106 can process the selection and can determine what other selections are possible based on the current selections. In an aspect, flags can enable the logical inference engine 106 to work out the possible selections. By way of example, two flags can be used: the first flag can represent whether a value is selected or not, the second can represent whether or not a value selection is possible. For every click in an application, states and colors for all field values can be calculated. These can be referred to as state vectors, which can allow for state evaluation propagation between tables.

In an aspect, upon receipt of the user selection, a recommendation engine 122 can analyze the selection and provide one or more recommendations of one or more charts and/or analyses that the user may find beneficial. The recommendation engine 122 can determine one or more data fields underlying the user selection, query a graph database (e.g., the internal database 120) using the one or more data fields, and identify one or more similar datasets. The recommendation engine 122 can determine what analyses and/or charts were used in the identified one or more similar datasets and present those analyses and/or charts as a recommendation. In another aspect, the recommendation engine can determine all data fields in the dataset and query the graph database. For each field, the graph database can be queried for every instance in which a field has occurred, the context, and the underlying dataset for those fields. Context refers to other fields a field was paired with and aggregations that include the field and/or the other fields with which a field was paired. The underlying datasets are then scored.

The recommendation engine 122 can generate a score data structure (e.g., fingerprint). Generating a score data structure can comprise determining a field name and a data type of the field, and then hashing the field name and the data type. The recommendation engine 122 can utilized natural language processing techniques to disambiguate or otherwise normalize field names. Thus, a score data structure can be a hash. The recommendation engine 122 can generate a score data structure for all data fields in the user's dataset or only those fields selected by the user. The recommendation engine can then compare the generated score data structures to previously generated score data structures for the datasets returned from the graph database. The higher the number of matches between the generated score data structures and the previously generated score data structures the higher the score, and more similar the datasets.

The logical inference engine 106 can utilize an associative model to connect data. In the associative model, all the fields in the data model have a logical association with every other field in the data model. Depending on the amount of data, the data model can be too large to be loaded into memory. To address this issue, the logical inference engine 106 can generate one or more indexes for the data model. The one or more indexes can be loaded into memory in lieu of the data model. The one or more indexes can be used as the associative model. An index is used by database management programs to provide quick and efficient associative access to a table's records. An index is a data structure (for example, a B-tree, a hash table, and the like) that stores attributes (e.g., values) for a specific column in a table. A B-tree is a self-balancing tree data structure that keeps data sorted and allows searches, sequential access, insertions, and deletions in logarithmic time. The B-tree is a generalization of a binary search tree in that a node can have more than two children. A hash table (also referred to as a hash index) can comprise a collection of buckets organized in an array. A hash function maps index keys to corresponding buckets in the hash index.

Thus, the logical inference engine 106 can determine a data subset based on user selections. The logical inference engine 106 automatically maintains associations among every piece of data in the entire dataset used in an application. The logical inference engine 106 can store the binary state of every field and of every data table dependent on user selection (e.g., included or excluded). This can be referred to as a state space and can be updated by the logical inference engine 106 every time a selection is made. There is one bit in the state space for every value in the symbol table or row in the data table, as such the state space is smaller than the data itself and faster to query. The inference engine will work associating values or binary symbols into the dimension tuples. Dimension tuples are normally needed by a hypercube to produce a result.

The associations thus created by the logical inference engine 106 means that when a user makes a selection, the logical inference engine 106 can resolve (quickly) which values are still valid (e.g., possible values) and which values are excluded. The user can continue to make selections, clear selections, and make new selections, and the logical inference engine 106 will continue to present the correct results from the logical inference of those selections. In contrast to a traditional join model database, the associative model provides an interactive associative experience to the user.

Based on current selections and possible rows in data tables a calculation/chart engine 108 can calculate aggregations in objects forming transient hypercubes in an application. The calculation/chart engine 108 can further build a virtual temporary table from which aggregations can be made. The calculation/chart engine 108 can perform a calculation/evaluation (e.g., evaluate an expression in response to a user selection/de-selection) via a multithreaded operation. The state space can be queried to gather all of the combinations of dimensions and values necessary to perform the calculation. In an aspect, the query can be on one thread per object, one process, one worker, combinations thereof, and the like. The expression can be calculated on multiple threads per object.

Results of the calculation can be passed to a rendering engine 116 and/or optionally to an extension engine 110. Optionally, the extension engine 110 can be implemented to communicate data via an interface 112 to an external engine 114. In another aspect, the extension engine 110 can communicate data, metadata, a script, a reference to one or more artificial neural networks (ANNs), one or more commands to be executed, one or more expressions to be evaluated, combinations thereof, and the like to the external engine 114. The interface 114 can comprise, for example, an Application Programming Interface (API). The external engine 114 can comprise one or more data processing applications (e.g., simulation applications, statistical applications, mathematical computation applications, database applications, combinations thereof, and the like). The external engine 114 can be, for example, one or more of MATLAB®, R, Maple®, Mathematica®, combinations thereof, and the like.

In an aspect, the external engine 114 can be local to the associative data indexing engine 100 or the external engine 114 can be remote from the associative data indexing engine 100. The external engine 114 can perform additional calculations and transmit the results to the extension engine 110 via the interface 112. A user can make a selection in the data model of data to be sent to the external engine 114. The logical inference engine 106 and/or the extension engine 110 can generate data to be output to the external engine 114 in a format to which the external engine 114 is accustomed to processing. In an example application, tuples forming a hypercube can comprise two dimensions and one expression, such as (Month, Year, Count (ID)), ID being a record identification of one entry. Then said tuples can be exchanged with the external engine 114 through the interface 112 as a table. If the data comprise births there can be timestamps of the births and these can be stored as month and year. If a selection in the data model will give a set of month-year values that are to be sent out to an external unit, the logical inference engine 106 and/or the extension engine 110 can ripple that change to the data model associatively and produce the data (e.g., set and/or values) that the external engine 114 needs to work with. The set and/or values can be exchanged through the interface 112 with the external engine 114. The external engine 114 can comprise any method and/or system for performing an operation on the set and/or values. In an aspect, operations on the set and/or values by the external engine 114 can be based on tuples (aggregated or not). In an aspect, operations on the set and/or values by the external engine 114 can comprise a database query based on the tuples. Operations on the set and/or values by the external engine 114 can be any transformation/operation of the data as long as the cardinality of the result is consonant to the sent tuples/hypercube result.

In an aspect, tuples that are transmitted to the external engine 114 through the interface 112 can result in different data being received from the external engine 114 through the interface 112. For example, a tuple consisting of (Month, Year, Count (ID)) should return as 1-to-1, m-to-1 (where aggregations are computed externally) or n-to-n values. If data received are not what were expected, association can be lost. Transformation of data by the external engine 114 can be configured such that cardinality of the results is consonant to the sent tuples and/or hypercube results. The amount of values returned can thus preserve associativity.

Results received by the extension engine 110 from the external engine 114 can be appended to the data model. In an aspect, the data can be appended to the data model without intervention of the script engine 104. Data model enrichment is thus possible "on the fly." A natural work flow is available allowing clicking users to associatively extend the data. The methods and systems disclosed permit incorporation of user implemented functionality into a presently used work flow. Interaction with third party complex computation engines, such as MATLAB® or R, is thus facilitated.

The logical inference engine 106 can couple associated results to the external engine 114 within the context of an already processed data model. The context can comprise tuple or tuples defined by dimensions and expressions computed by hypercube routines. Association is used for determination of which elements of the present data model are relevant for the computation at hand. Feedback from the external engine 114 can be used for further inference inside the inference engine or to provide feedback to the user.

A rendering engine 116 can produce a desired graphical object (charts, tables, etc.) based on selections/calculations. When a selection is made on a rendered object there can be a repetition of the process of moving through one or more of the logical inference engine 106, the calculation/chart engine 108, the extension engine 110, the external engine 114, and/or the rendering engine 116. The user can explore the scope by making different selections, by clicking on graphical objects to select variables, which causes the graphical object to change. At every time instant during the exploration, there exists a current state space, which is associated with a current selection state that is operated on the scope (which always remains the same).

Different tools 118 can be used to publish, export, or deploy any output of the associative data indexing engine 100. Such output can be any form of visual representation, including, but not limited to, textual, graphical, animation, audio, tactile, and the like.

In an aspect, a tool 118 can comprise a knowledge graph tool. The knowledge graph tool can analyze (e.g., scrape) graphical objects (e.g., charts) previously generated by the rendering engine 116. The rendering engine 116 can generate many charts for many users over time. These charts can be stored and accessed by the knowledge graph tool. The knowledge graph tool can scrape the charts to determine dimensions and measures used in a chart and trace those dimensions and measures back to the fields in the datasets used to create those charts. Such information is then organized in a knowledge graph and stored in a graph database (e.g., internal database 120).

The internal database 120 may employ any data structure suitable for maintaining knowledge graph data in a graph database. In certain examples, the internal database 120 may include a knowledge graph database that employs graph structures such as nodes, properties, and edges based on graph theory to represent subjects and relationships between subjects. For example, knowledge graph data store 110 may include a knowledge graph database the employs nodes, properties, and edges defined in accordance with a graph data model such as a Resource Description Framework ("RDF") graph data model. Accordingly, knowledge graph data stored in knowledge graph data store 110 may include semantically linked data that is organized in accordance with a graph data model to form a multi-dimensional knowledge graph.

For example, the internal database 120 may maintain the knowledge graph in a graph database. The knowledge graph may include nodes that represent subjects and edges that interconnect the nodes and represent relationships between and/or properties of the subjects. In certain examples, the knowledge graph may be defined by triples statements, such as a subject-predicate-object statement that indicates a predicate relationship between a subject and an object.

The internal database 120 may maintain knowledge graph data in a graph database as proprietary or open source data. The internal database 120 may include any known knowledge graph system, such as knowledge graph systems known as CAYLEY.IO, DBPEDIA, FREEBASE, WIKIDATA, and KNOWLEDGE GRAPH.

Figure 5A:
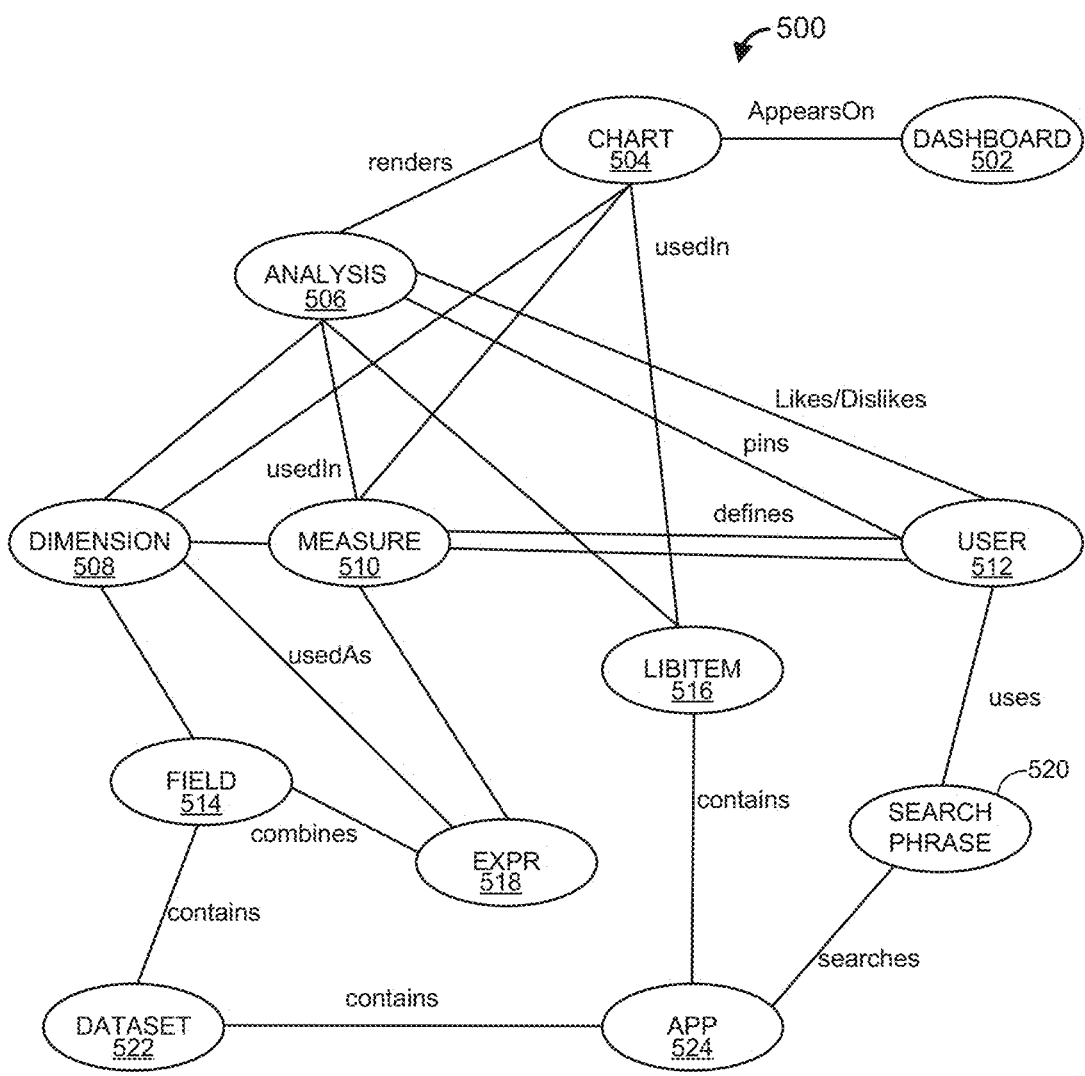
FIG. 5A-B are example representations of knowledge graphs.
Figure 5B:
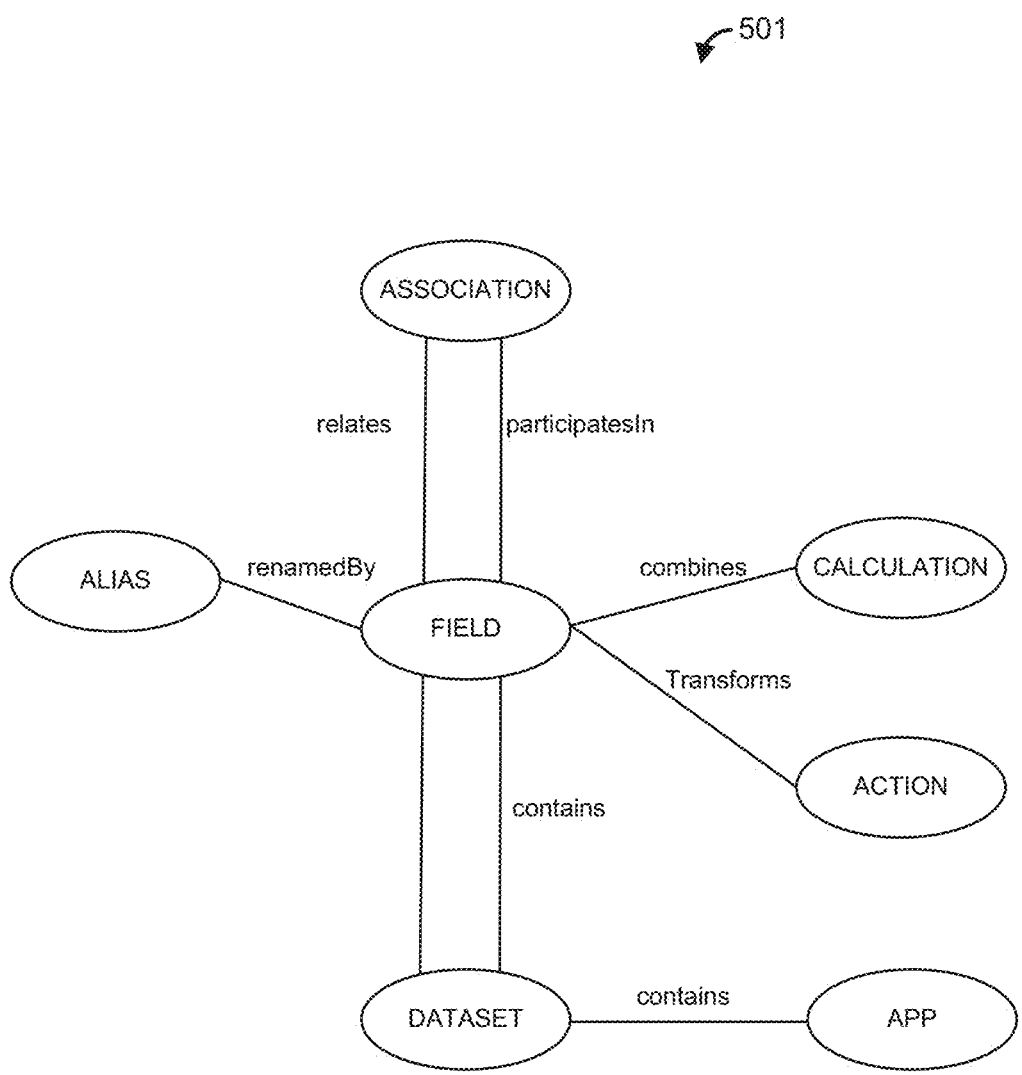

FIG. 5A illustrates an example topology for a knowledge graph 500 generated by scraping charts. The knowledge graph 500 can then be used as part of a disclosed chart recommendation method. Similarly, the knowledge graph tool can scrape load scripts to determine data preparation precedents or alternatively collect such information as users interact with a data preparation tool. Such information can also then be organized in a knowledge graph. FIG. 5B illustrates an example topology for a knowledge graph 501 generated by scraping load scripts. The chart 501 can then be used as part of a disclosed data preparation recommendation method.

The knowledge graph tool may include a natural language processor. The knowledge graph tool can be configured to identify entities and relationships between entities of charts and/or load scripts. The knowledge graph tool may determine functional dependencies between entities, associations, and other semantic relationships. The knowledge graph tool can operate according to predefined rules that establish relationships between entities, e.g., a "dataset" "contains" a "field"). The natural language processor may be configured to perform NLP to ingest a chart and/or a load script and utilize a thesaurus, ontology, etc to disambiguate ingested chart data. For example, a dataset may include a "client" dimension, while another dataset may include a "client_name" dimension, while still another dataset may include a "company" dimension. The natural language processor may determine that all three words refer to the same concept and normalize variants to a common name. To construct the knowledge graph, graph databases may be used. A graph database (or knowledge graph) may have any size or contain any information in one or more graph structures where nodes represent entities and edges define the relation across entities.

The knowledge graph 500 of FIG. 5A includes twelve nodes 502-524, with each node representing a different concept. For example, a node may represent a dashboard, a chart, an analysis, a dimension, a measure, a field of a dataset, a dataset, an expression, an application (e.g., "app"), a library item (e.g., "LibItem"), a search phrase, and/or a user, described in one or more ingested charts. For example, a node may represent the client dimension of FIG. 2, a data field associated with the client dimension, a measure that operates on the client dimension (e.g., Sum(Number*Price), per client, year), combinations thereof, and the like. The nodes 502-524 are connected by edges that represent connections (relationships) between the concepts. For example, if two connected concepts correspond to an analysis and a measure, an edge connecting them may represent a link for the measure having been used in the analysis. By way of another example, if two connected concepts correspond to a dataset and a field, an edge connecting them may represent a link for the dataset containing the field. The knowledge graph tool can comprise a natural language processing (NLP) system to generate the knowledge graph 500 using known natural language processing techniques and according to predefined rules that govern the unique relationships between concepts found in charts.

The nodes 502-524 may be generated using "fuzzy logic" and/or concept matching, which may be done to ensure that different words or phrases relating to the same concept are included in a single node (e.g., if a field name varies between datasets but represents the same category of data). Fuzzy logic is a technique that may represent different representations of a name or concept as a same entity. For example, a dataset may include a "client" dimension, while another dataset may include a "client_name" dimension, while still another dataset may include a "company" dimension. The NLP system using natural language processing techniques and fuzzy logic may determine that all three words refer to the same concept. Accordingly, all three terms may be represented in the knowledge graph using a single node and any edges between any of the three terms and other concepts may connect to that node.

The nodes 502-524 can be weighted according to their importance. This may be represented in the knowledge graph 500 by making the nodes 502-524 larger or smaller. The nodes 502-524 may be weighted according to the importance of the associated concept. For example, concepts such as a measure previously used by a user may be weighted more heavily. Conversely, measures that are less frequently used may be weighted less heavily.

Figure 3:
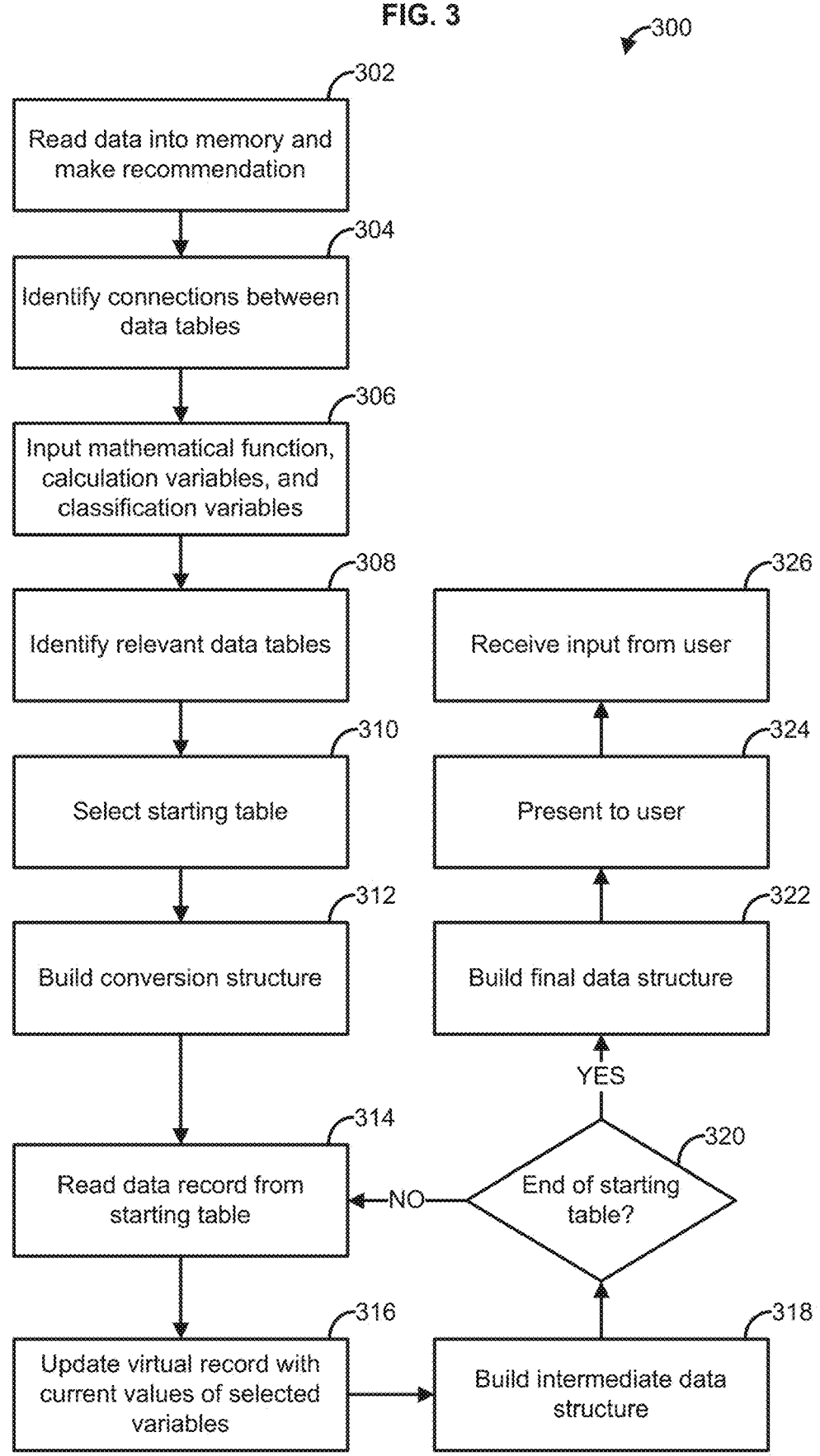
FIG. 3 is a schematic flowchart showing basic steps performed when extracting information from a database.

The methods provided can be implemented by means of a computer program as illustrated in a flowchart of a method 300 in FIG. 3. In a step 302, the program can read some or all data records in the database, for instance using a SELECT statement which selects all the tables of the database, e.g. Tables 1-5. In an aspect, the database can be read into primary memory of a computer. Once the data is read into memory, the program can make one or more recommendations for various analyses and/or charts that could be beneficial to a user. The one or more recommendations can be made based in part on querying a graph database as described in step 326.

To increase evaluation speed, each unique value of each data variable in said database can be assigned a different binary code and the data records can be stored in binary-coded form. This can be performed, for example, when the program first reads the data records from the database. For each input table, the following steps can be carried out. The column names, e.g., the variables, of the table can be read (e.g., successively). Every time a new data variable appears, a data structure can be instantiated for the new data variable. An internal table structure can be instantiated to contain some or all the data records in binary form, whereupon the data records can be read (e.g., successively) and binary-coded. For each data value, the data structure of the corresponding data variable can be checked to establish if the value has previously been assigned a binary code. If so, that binary code can be inserted in the proper place in the above-mentioned table structure. If not, the data value can be added to the data structure and assigned a new binary code, for example the next binary code in ascending order, before being inserted in the table structure. In other words, for each data variable, a unique binary code can be assigned to each unique data value.

After having read some or all data records in the database, the program can analyze the database in a step 304 to identify all connections between the data tables. A connection between two data tables means that these data tables have one variable in common. In an aspect, step 304 can comprise generation of one or more bidirectional table indexes and one or more bidirectional associative indexes. In an aspect, generation of one or more bidirectional table indexes and one or more bidirectional associative indexes can comprise a separate step. In another aspect, generation of one or more bidirectional table indexes and one or more bidirectional associative indexes can be on demand. After the analysis, all data tables are virtually connected. In FIG. 2, such virtual connections are illustrated by double ended arrows. The virtually connected data tables can form at least one so-called "snowflake structure," a branching data structure in which there is one and only one connecting path between any two data tables in the database. Thus, a snowflake structure does not contain any loops. If loops do occur among the virtually connected data tables, e.g., if two tables have more than one variable in common, a snowflake structure can in some cases still be formed by means of special algorithms known in the art for resolving such loops.

After this initial analysis, the user can explore the database. In doing so, the user defines in a step 306 a mathematical function (e.g., a measure) to be evaluated/calculated/determined, which could be a combination of mathematical expressions. Assume that the user wants to extract the total sales per year and client from the database in FIG. 2. The user defines a corresponding mathematical function "SUM (x*y)", and selects the calculation variables to be included in this function: "Price" and "Number." The user also selects the classification variables: "Client" and "Year." In an aspect, the user can select a recommended measure to evaluate, based on the recommendations provided at step 302.

The computer program then identifies in a step 308 all relevant data tables, e.g., all data tables containing any one of the selected calculation and classification variables, such data tables being denoted boundary tables, as well as intermediate data tables in the connecting path(s) between these boundary tables in the snowflake structure, such data tables being denoted connecting tables. There are no connecting tables in the present example. In an aspect, one or more bidirectional table indexes and one or more bidirectional associative indexes can be accessed as part of step 308.

In the present example, all occurrences of every value, e.g., frequency data, of the selected calculation variables can be included for evaluation of the mathematical function. In FIG. 2, the selected variables ("Price," "Number") can require such frequency data. Now, a subset (B) can be defined that includes all boundary tables (Tables 1-2) containing such calculation variables and any connecting tables between such boundary tables in the snowflake structure. It should be noted that the frequency requirement of a particular variable is determined by the mathematical expression in which it is included. Determination of an average or a median calls for frequency information. In general, the same is true for determination of a sum, whereas determination of a maximum or a minimum does not require frequency data of the calculation variables. It can also be noted that classification variables in general do not require frequency data.

Then, a starting table can be selected in a step 310, for example, among the data tables within subset (B). In an aspect, the starting table can be the data table with the largest number of data records in this subset. In FIG. 2, Table 2 can be selected as the starting table. Thus, the starting table contains selected variables ("Client," "Number"), and connecting variables ("Date," "Product"). These connecting variables link the starting table (Table 2) to the boundary tables (Tables 1 and 3).

Thereafter, a conversion structure can be built in a step 312. This conversion structure can be used for translating each value of each connecting variable ("Date," "Product") in the starting table (Table 2) into a value of a corresponding selected variable ("Year," "Price") in the boundary tables (Table 3 and Table 1, respectively). A table of the conversion structure can be built by successively reading data records of Table 3 and creating a link between each unique value of the connecting variable ("Date") and a corresponding value of the selected variable ("Year"). It can be noted that there is no link from value 4 ("Date: 1999-01-12"), since this value is not included in the boundary table. Similarly, a further table of the conversion structure can be built by successively reading data records of Table 1 and creating a link between each unique value of the connecting variable ("Product") and a corresponding value of the selected variable ("Price"). In this example, value 2 ("Product: Toothpaste") is linked to two values of the selected variable ("Price: 6.5"), since this connection occurs twice in the boundary table. Thus, frequency data can be included in the conversion structure. Also note that there is no link from value 3 ("Product: Shampoo").

When the conversion structure has been built, a virtual data record can be created. Such a virtual data record accommodates all selected variables ("Client," "Year," "Price," "Number") in the database. In building the virtual data record, a data record is read in a step 314 from the starting table (Table 2). Then, the value of each selected variable ("Client", "Number") in the current data record of the starting table can be incorporated in the virtual data record in a step 316. Also, by using the conversion structure each value of each connecting variable ("Date", "Product") in the current data record of the starting table can be converted into a value of a corresponding selected variable ("Year", "Price"), this value also being incorporated in the virtual data record.

In a step 318 the virtual data record can be used to build an intermediate data structure. Each data record of the intermediate data structure can accommodate each selected classification variable (dimension) and an aggregation field for each mathematical expression implied by the mathematical function. The intermediate data structure can be built based on the values of the selected variables in the virtual data record. Thus, each mathematical expression can be evaluated based on one or more values of one or more relevant calculation variables in the virtual data record, and the result can be aggregated in the appropriate aggregation field based on the combination of current values of the classification variables ("Client," "Year").

The above procedure can be repeated for one or more additional (e.g., all) data records of the starting table. In a step 320 it can be checked whether the end of the starting table has been reached. If not, the process can be repeated from step 314 and further data records can be read from the starting table. Thus, an intermediate data structure can be built by successively reading data records of the starting table, by incorporating the current values of the selected variables in a virtual data record, and by evaluating each mathematical expression based on the content of the virtual data record. If the current combination of values of classification variables in the virtual data record is new, a new data record can be created in the intermediate data structure to hold the result of the evaluation. Otherwise, the appropriate data record is rapidly found, and the result of the evaluation is aggregated in the aggregation field.

Thus, data records can be added to the intermediate data structure as the starting table is traversed. The intermediate data structure can be a data table associated with an efficient index system, such as an AVL or a hash structure. The aggregation field can be implemented as a summation register, in which the result of the evaluated mathematical expression is accumulated.

In some aspects, e.g., when evaluating a median, the aggregation field can be implemented to hold all individual results for a unique combination of values of the specified classification variables. It should be noted that only one virtual data record is needed in the procedure of building the intermediate data structure from the starting table. Thus, the content of the virtual data record can be updated for each data record of the starting table. This can minimize the memory requirement in executing the computer program.

After traversing the starting table, the intermediate data structure can contain a plurality of data records. If the intermediate data structure accommodates more than two classification variables, the intermediate data structure can, for each eliminated classification variable, contain the evaluated results aggregated over all values of this classification variable for each unique combination of values of remaining classification variables.

When the intermediate data structure has been built, a final data structure, e.g., a multidimensional cube (hypercube), as shown in non-binary notation in Table 6 of FIG. 4, can be created in a step 322 by evaluating the mathematical function ("SUM (x*y)") based on the results of the mathematical expression ("x*y") contained in the intermediate data structure. In doing so, the results in the aggregation fields for each unique combination of values of the classification variables can be combined. In the example, the creation of the final data structure is straightforward, due to the trivial nature of the present mathematical function. The content of the final data structure can be presented to the user, for example in a two-dimensional table, in a step 324, as shown in Table 7 of FIG. 4. Alternatively, if the final data structure contains many dimensions, the data can be presented in a pivot table, in which the user can interactively move up and down in dimensions.

Returning to FIG. 3, at step 326, input from the user can be received. For example, input from the user can be a query in a form of a selection and/or de-selection of the presented results and/or visual representation (e.g., chart). For example, the database disclosed herein can be queried by specifying the data element types and data element values of interest and by further specifying any functions to apply to the data contained within the specified data element types of the database. The functions which can be used within a query can include, for example, expressions using statistics, sub-queries, filters, mathematical formulas, and the like, to help the user to locate and/or calculate the specific information wanted from the database. Once located and/or calculated, the results of a query can be displayed to the user according to various visualization techniques. One or more recommendations can be provided to the user along with the presented results and/or visual representations.

The graphical objects (or visual representations) can be substantially any display or output type including graphs, charts, trees, multi-dimensional depictions, images (computer generated or digital captures), video/audio displays describing the data, hybrid presentations where output is segmented into multiple display areas having different data analysis in each area and so forth. A user can select one or more default visual representations; however, a subsequent visual representation can be generated on the basis of further analysis and subsequent dynamic selection of the most suitable form for the data.

In an aspect, a user can select a data point and a visualization component can instantaneously filter and re-aggregate other fields and corresponding visual representations based on the user's selection. In an aspect, the filtering and re-aggregation can be completed without querying a database. In an aspect, a visual representation can be presented to a user with color schemes applied meaningfully. For example, a user selection can be highlighted in green, datasets related to the selection can be highlighted in white, and unrelated data can be highlighted in gray. A meaningful application of a color scheme provides an intuitive navigation interface in the state space.

Figure 6:
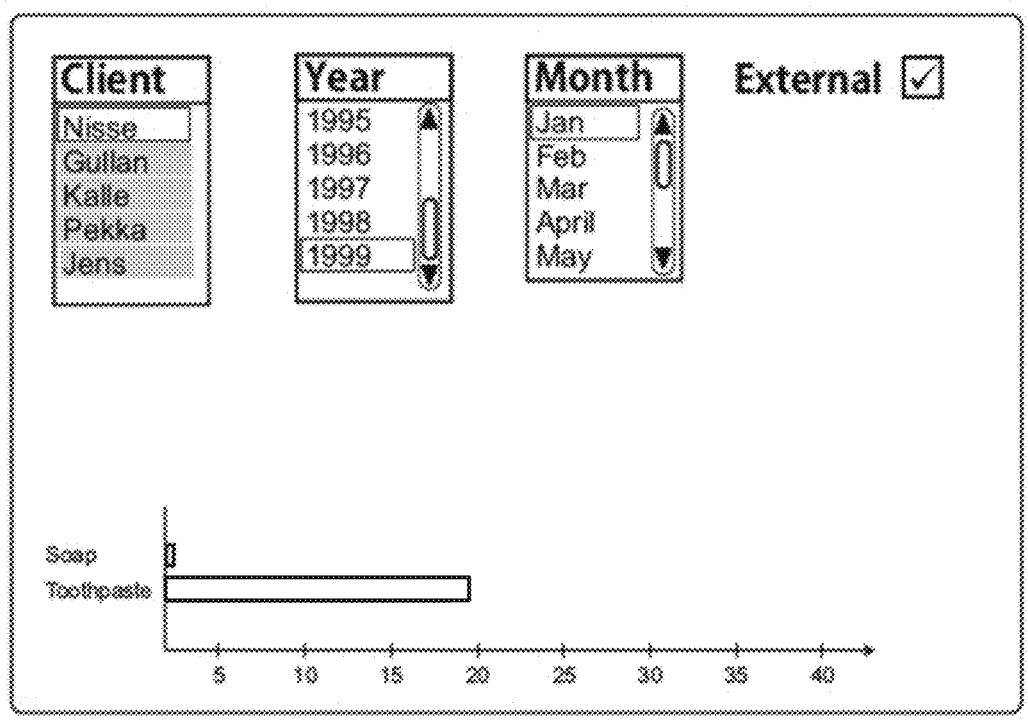
FIG. 6 is a an example user interface.

The result of a standard query can be a smaller subset of the data within the database, or a result set, which is comprised of the records, and more specifically, the data element types and data element values within those records, along with any calculated functions, that match the specified query. For example, as indicated in FIG. 6, the data element value "Nisse" can be specified as a query or filtering criteria as indicated by a frame in the "Client" header row. In some aspects, the selected element can be highlighted in green. By specifically selecting "Nisse," other data element values in this row are excluded as shown by gray areas. Further, "Year" "1999" and "Month" "Jan" are selected in a similar way.

Returning to FIG. 3, at 326, the one or more recommendations provided to the user can be based on a user selection or can be based on the user's underlying dataset. The one or more recommendations can be based on a knowledge graph and an assessment of similarity between fields of datasets. For example, the recommendation can suggest a data preparation or best way to assemble a number of fields as measure and dimensions in a chart. In another example, the recommendation can suggest which subset of fields tend to be used most often and/or a most likely aggregation for certain fields when used as a measure in combination with certain other fields. For example, in a dataset that tracks world population (female/male) over the last 10 years, the knowledge graph can be leveraged to recommend SUM as best way to aggregation population for a country if the analysis is time-based (e.g., world's population over last 3 years) vs. a non-time based analysis (top 10 countries by their population) where the LAST or AVG population should be used instead.

The user selected fields can be used to query the knowledge graph. Results returned from the knowledge graph can provide the context in which those fields occurred in other analyses and/or charts along with an identifier of datasets underlying those other analysis and/or charts. The user selected fields can be compared to fields in those underlying datasets to determine which datasets are most similar to the user selected fields via fingerprinting. Analyses and charts associated with datasets that are most similar can be provided to the user as a recommendation.

Figure 7:
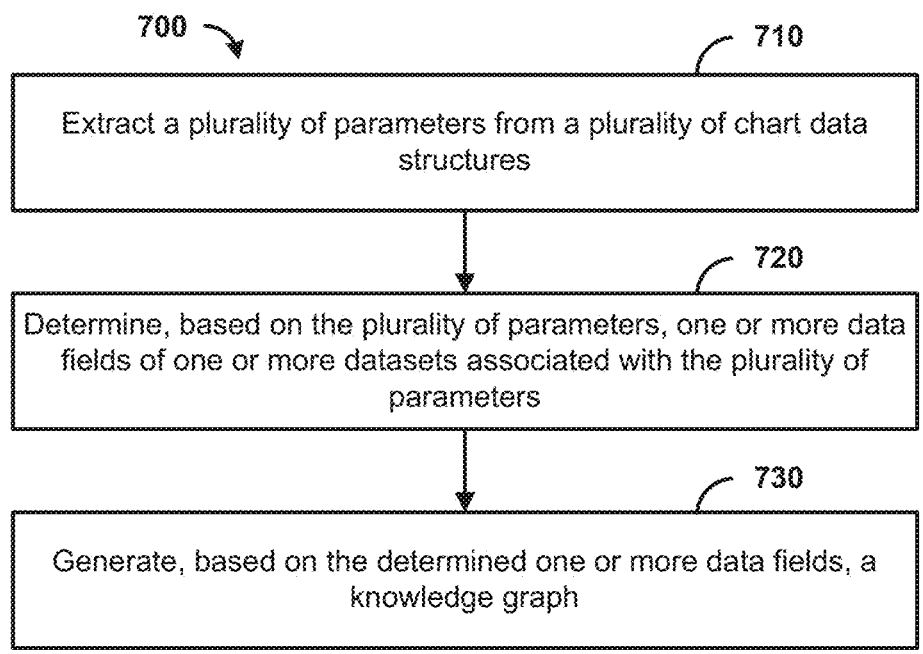
FIG. 7 is a flow chart illustrating an example method.

In an aspect, illustrated in FIG. 7 provided is a method 700 for generating and using a knowledge graph. At step 710, a plurality of parameters may be extracted (e.g., by a computing device) from a plurality of chart data structures stored in a database. The plurality of chart data structures may be associated with a plurality of tables of records. Each table may include a header row that identifies a data element type (e.g., a dimension or a field) that is included within the table. The plurality of parameters may include at least one of a dimension, a measure, an aggregation of dimensions or measures, or a pairing of dimensions or measures. A measure may be a result of an operation that is performed on a dimension (e.g., a result of an operation on values of data fields associated with a dimension). The plurality of chart data structures may be generated via one or more multidimensional cube data structures (e.g., the multidimensional cube as shown in Table 6 of FIG. 4).

At step 720, based on the plurality of parameters, one or more data fields of one or more datasets associated with the plurality of parameters may be determined. The one or more data fields may be determined by a recommendation engine (e.g., recommendation engine 122). The one or more data fields may be based on a query (e.g., received via a user interface) that is associated with one or more of the plurality of tables of records (e.g., the recommendation engine may determine the one or more data fields based on the query).

At step 730, based on the determined one or more data fields, a knowledge graph may be generated. Generating the knowledge graph may include determining a plurality of nodes. The plurality of nodes may represent subjects and edges that interconnect the nodes and represent relationships between and/or properties of the subjects. The knowledge graph may be defined by triples statements, such as a subject-predicate-object statement that indicates a predicate relationship between a subject and an object. Each node may relate to a semantic concept. Generating the knowledge graph may include connecting two or more of the plurality of nodes with one or more edges. Each of the one or more edges may relate to relationships between the semantic concepts. The semantic concepts and the relationships may be pre-defined according to an ontology. The knowledge graph may be stored in a graph database.

The method 700 can further comprise determining a result fingerprint (e.g., a score data structure) for the one or more data fields of the one or more datasets associated with the plurality of parameters. Determining the result fingerprint for the one or more data fields of the one or more datasets associated with the plurality of parameters may include determining, for each data field, a field name. For each data field a data type (e.g., a dimension) may be determined. The field name for each data field and the data type for each data field may be used to generate the result fingerprint.

Figure 8:
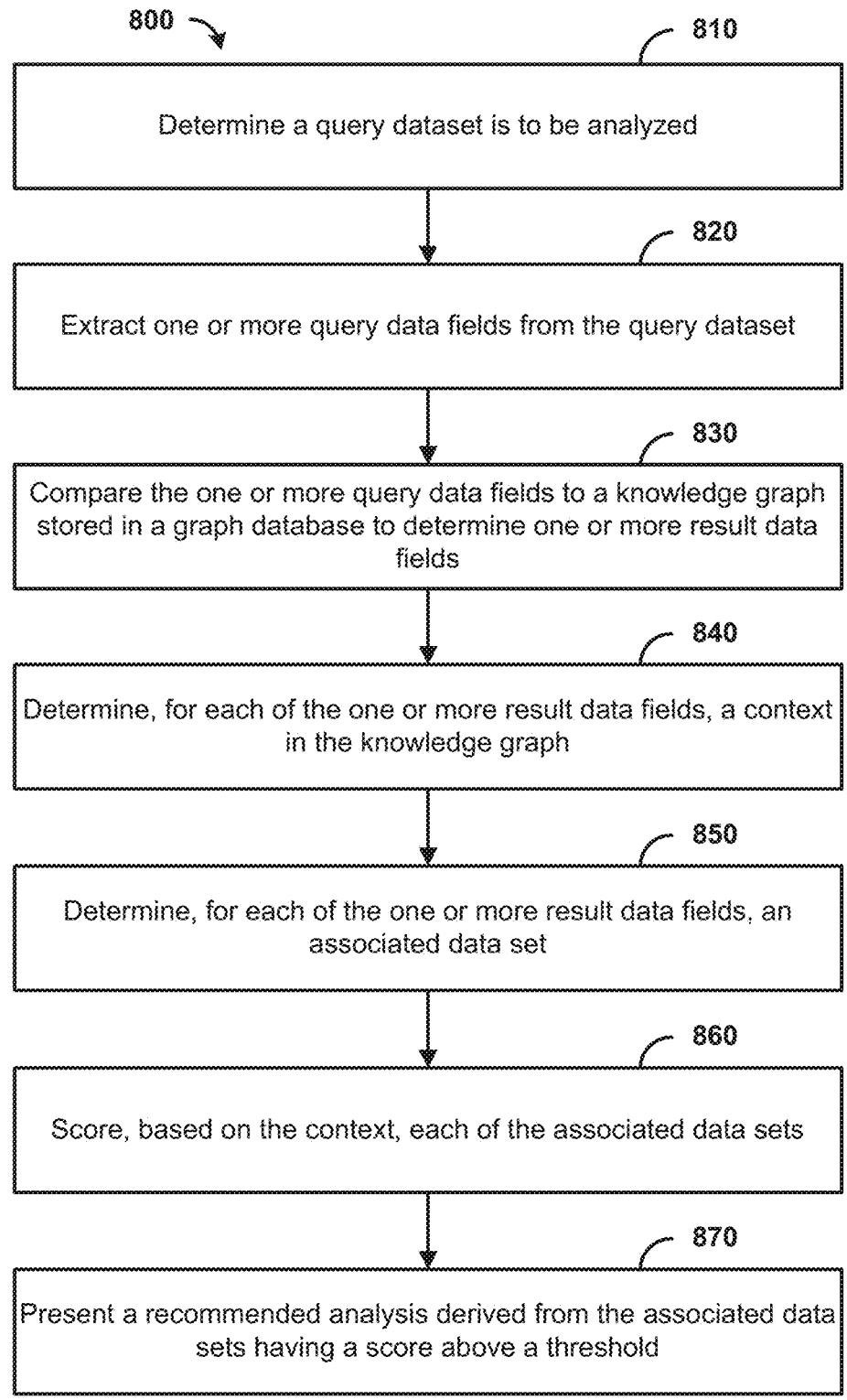
FIG. 8 is a flow chart illustrating an example method.

In an aspect, illustrated in FIG. 8 provided is a method 800 for generating and using a knowledge graph. At step 810, a query dataset that is to be analyzed may be determined (e.g., by a computing device). The query dataset may be determined based on a selection by a user of a portion of a dataset. The selection by the user may cause a logical inference engine (e.g., logical inference engine 106) to evaluate a number of filters on the dataset. The query dataset may be a result of evaluating the number of filters on the dataset.

At step 830, one or more query data fields may be extracted from the query dataset. The one or more query data fields may be associated with a scope of the selection by the user. The scope may be based on the tables included in the selection by the user and how they are joined. At step 830, the one or more query data fields may be compared to a knowledge graph stored in a graph database. Based on the comparison of the one or more query data fields to the knowledge graph, one or more result data fields may be determined. At step 840, a context in the knowledge graph may be determined for each of the one or more result data fields. Determining the context for the one or more result data fields can comprise determining one or more other data fields paired with each result data field. Determining the context for the one or more result data fields can comprise determining aggregations of the one or more other data fields paired with each result data field and the result data field. At step 850, an associated data set may be determined for each of the one or more result data fields.

At step 860, based on the context, each of the associated data sets may be scored. Scoring each of the associated data sets, based on the context, may include assigning, based on a number of a number of fields in common between the associated data set and the one or more query data fields, a weight to each of the associated data sets. Scoring each of the associated data sets can comprise determining a query fingerprint for the query dataset, comparing the query fingerprint to a plurality of result fingerprints, and determining, based on the comparison, one or more result fingerprints that are similar to the query fingerprint. Determining a query fingerprint for the query dataset can comprise determining a field name for the one or more query data fields, determining a data type for the one or more query data fields, and hashing the field name and the data type to generate the query fingerprint. The method 800 can further comprise determining a field name for the one or more result data fields, determining a data type for the one or more result data fields, and hashing the field name and the data type to generate the result fingerprint. Determining a field name can comprise presenting the field name to a natural language processor to determine a normalized field name.

At step 870, a recommended analysis derived from the associated data sets having a score above a threshold can be presented (e.g., at a user interface). The method 800 can further comprise extracting a plurality of parameters from a plurality of chart data structures. Based on the plurality of parameters, one or more result data fields of one or more datasets associated with the plurality of parameters may be determined. The knowledge graph may be determined based on the determined one or more data fields. The plurality of parameters can comprise at least one of a dimension, a measure, an aggregation of dimensions or measures, or a pairing of dimensions or measures. Scoring, based on the context, each of the associated data sets can comprise assigning, based on a similarity of one or more of a measure or a dimension of one of the plurality of chart data structures to the query data set, a weight to each of the associated data sets. Feedback indicative of whether the recommended analysis was useful to a user may be received (e.g., via the user interface). One or more weights and/or scores associated with results can be adjusted based on the feedback. In an aspect, a result can be excluded from future results based on the feedback.

Figure 9:
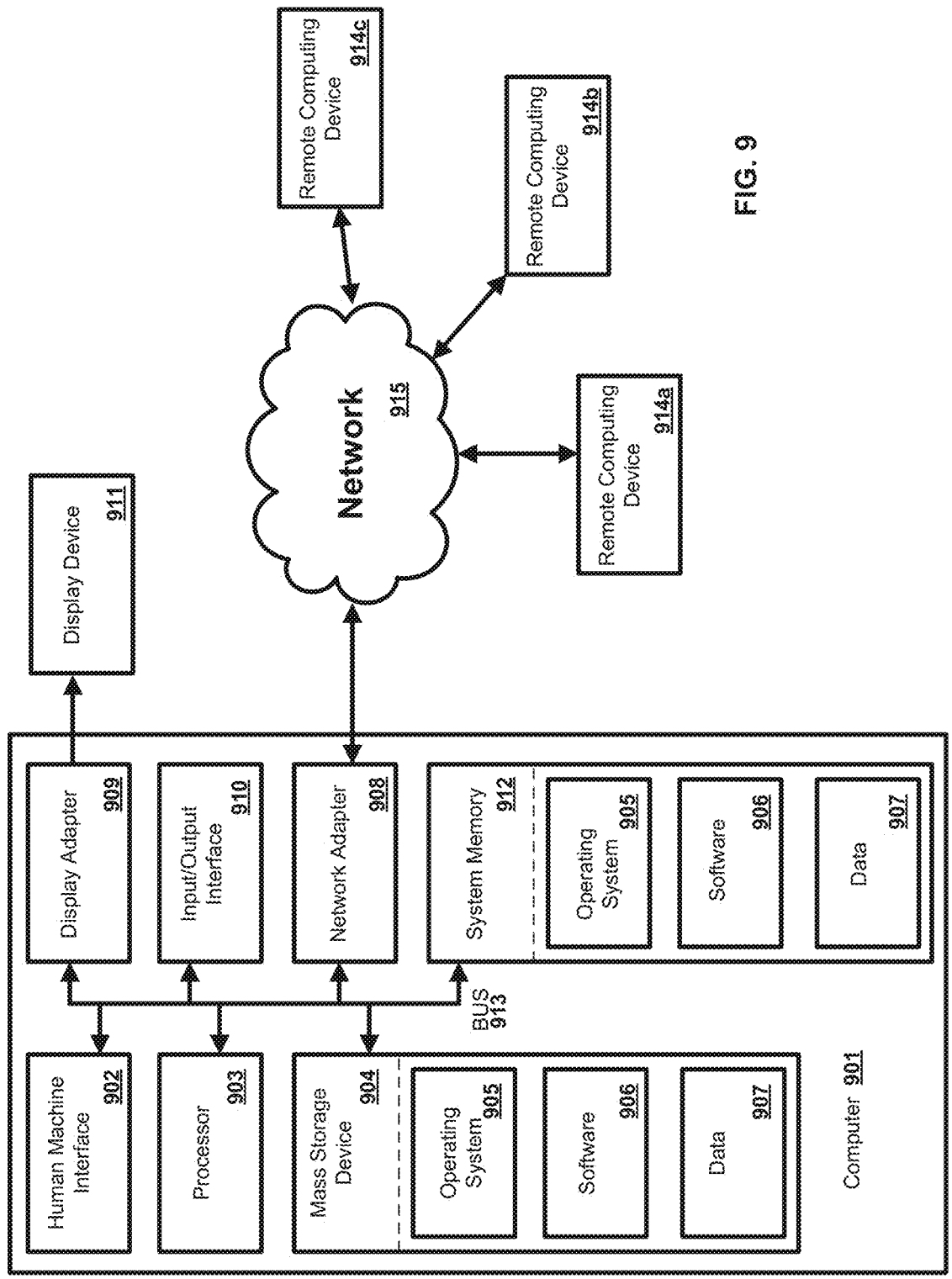
FIG. 9 is an exemplary operating environment for performing the disclosed methods.

In an exemplary aspect, the methods and systems can be implemented on a computer 901 as illustrated in FIG. 9 and described below. Similarly, the methods and systems disclosed can utilize one or more computers to perform one or more functions in one or more locations. FIG. 9 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 901. The components of the computer 901 can comprise, but are not limited to, one or more processors 903, a system memory 912, and a system bus 913 that couples various system components including the one or more processors 903 to the system memory 912. The system can utilize parallel computing.

The system bus 913 represents one or more of several possible types of bus structures, including a memory bus or memory controller, a peripheral bus, an accelerated graphics port, or local bus using any of a variety of bus architectures. The bus 913, and all buses specified in this description can also be implemented over a wired or wireless network connection and each of the subsystems, including the one or more processors 903, a mass storage device 904, an operating system 905, associative data indexing engine software 906, data 907, a network adapter 908, the system memory 912, an Input/Output Interface 910, a display adapter 909, a display device 911, and a human machine interface 902, can be contained within one or more remote computing devices 914*a,b,c* at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as the data 907 and/or program modules such as the operating system 905 and the associative data indexing engine software 906 that are immediately accessible to and/or are presently operated on by the one or more processors 903.

In another aspect, the computer 901 can also comprise other removable/non-removable, volatile/non-volatile computer storage media. By way of example, FIG. 9 illustrates the mass storage device 904 which can provide non-volatile storage of computer code, computer readable instructions, data structures, program modules, and other data for the computer 901. For example and not meant to be limiting, the mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, the operating system 905 and the associative data indexing engine software 906. Each of the operating system 905 and the associative data indexing engine software 906 (or some combination thereof) can comprise elements of the programming and the associative data indexing engine software 906. The data 907 can also be stored on the mass storage device 904. The data 907 can be stored in any of one or more databases known in the art such as a graph database and/or a relational database. Examples of such databases comprise, DB2®, Microsoft® Access, Microsoft® SQL Server, Oracle®, mySQL, PostgreSQL, and the like. The databases can be centralized or distributed across multiple systems. The data 907 can comprise one or more knowledge graphs and/or one or more score data structures (e.g., fingerprints).

In an aspect, the associative data indexing engine software 906 can comprise one or more of a script engine, a logical inference engine, a calculation engine, an extension engine, and/or a rendering engine. In an aspect, the associative data indexing engine software 906 can comprise an external engine and/or an interface to the external engine.

In another aspect, the user can enter commands and information into the computer 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 903 via the human machine interface 902 that is coupled to the system bus 913, but can be connected by other interface and bus structures, such as a parallel port, game port, an IEEE 1394 Port (also known as a Firewire port), a serial port, or a universal serial bus (USB).

In yet another aspect, the display device 911 can also be connected to the system bus 913 via an interface, such as the display adapter 909. It is contemplated that the computer 901 can have more than one display adapter 909 and the computer 901 can have more than one display device 911. For example, the display device 911 can be a monitor, an LCD (Liquid Crystal Display), or a projector. In addition to the display device 911, other output peripheral devices can comprise components such as speakers (not shown) and a printer (not shown) which can be connected to the computer 901 via the Input/Output Interface 910. Any step and/or result of the methods can be output in any form to an output device. Such output can be any form of visual representation, including, but not limited to, textual, graphical, animation, audio, tactile, and the like. The display device 911 and computer 901 can be part of one device, or separate devices.

The computer 901 can operate in a networked environment using logical connections to one or more remote computing devices 914*a,b,c*. By way of example, a remote computing device can be a personal computer, portable computer, smartphone, a server, a router, a network computer, a peer device or other common network node, and so on. Logical connections between the computer 901 and a remote computing device 914*a,b,c* can be made via a network 915, such as a local area network (LAN) and/or a general wide area network (WAN). Such network connections can be through the network adapter 908. The network adapter 908 can be implemented in both wired and wireless environments. Such networking environments are conventional and commonplace in dwellings, offices, enterprise-wide computer networks, intranets, and the Internet. In an aspect, one or more of the remote computing devices 914*a, b,c* can comprise an external engine and/or an interface to the external engine.

For purposes of illustration, application programs and other executable program components such as the operating system 905 are illustrated herein as discrete blocks, although it is recognized that such programs and components reside at various times in different storage components of the computing device 901, and are executed by the one or more processors 903 of the computer. An implementation of the associative data indexing engine software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed:

1. A method comprising:
    extracting a plurality of parameters from a plurality of chart data structures, wherein the plurality of chart data structures are generated based on a plurality of datasets associated with one or more queries and the plurality of parameters;
    determining, based on the plurality of datasets, a field name and a data type for one or more data fields stored in one or more data tables in each respective dataset of the plurality of datasets;
    determining a hash of the field name and the data type for each of the one or more data fields stored in the one or more data tables in each respective dataset of the plurality of datasets;
    generating, based on the hash of the field name and the data type for each of the one or more data fields stored in the one or more data tables of each respective dataset, a result fingerprint; and
    generating, based on the result fingerprint, a knowledge graph, wherein the knowledge graph facilitates identifying one or more datasets of the plurality of datasets comprising data fields that are most similar to one or more query data fields of one or more further queries associated with one or more parameters of the plurality of parameters.

2. The method of claim 1, wherein the plurality of parameters comprises at least one of a dimension, a measure, an aggregation of dimensions or measures, or a pairing of dimensions or measures.

3. The method of claim 1, further comprising generating the plurality of chart data structures via one or more multidimensional cube data structures.

4. The method of claim 1, wherein generating the knowledge graph comprises:
    determining a plurality of nodes, wherein each node relates to a semantic concept; and
    connecting two or more of the plurality of nodes with one or more edges, wherein the one or more edges relate to relationships between the semantic concepts.

5. The method of claim 4, wherein the semantic concepts and the relationships are pre-defined according to an ontology.

6. The method of claim 1, further comprising, storing the knowledge graph in a graph database.

7. The method of claim 1, wherein
    the one or more data fields stored in the one or more data tables in each respective dataset comprise user-selected data fields associated with the one or more queries.

8. The method of claim 1, wherein the result fingerprint identifies each dataset of the plurality of datasets.

9. A method comprising:
    determining, based on a comparison between a knowledge graph and one or more query data fields of a query dataset, one or more result data fields, wherein one or more data tables of the query dataset comprise the one or more query data fields, and wherein the knowledge graph is indicative of a context for each of the one or more result data fields;
    determining, for each of the one or more result data fields, an associated data set;
    determining, for each of the one or more query data fields, a hash of a field name and a data type associated with that query data field;
    generating, based on the hash of the field name and the data type for each of the one or more query data fields a query fingerprint for the query dataset;
    determining, based on the context for each of the one or more result data fields and the query fingerprint, a score for each of the associated data sets, wherein each of the scores indicates an amount of similarity between the one or more query data fields and data fields in that associated data set; and
    presenting, based on the score for each of the associated data sets, a recommended analysis, wherein the recommended analysis is based on a most similar data set of the associated data sets, wherein the score for the most similar data set meets or exceeds a threshold.

10. The method of claim 9, further comprising determining, based on one or more other data fields indicated by the knowledge graph, the context for each of the one or more result data fields.

11. The method of claim 9, further comprising:
    comparing the query fingerprint to a plurality of result fingerprints; and determining, based on the comparison, one or more result fingerprints that are similar to the query fingerprint.

12. The method of claim 11, wherein the associated data sets are associated with the plurality of result fingerprints.

13. The method of claim 9, further comprising:
determining, for each of the one or more query data fields, the field name and the data type, wherein each data table the one or more data tables of the query dataset comprises a header row indicative of the field name and the data type.

14. The method of claim 13, wherein determining, for each of the one or more query data fields, the field name comprises presenting the field name to a natural language processor to determine a normalized field name.

15. The method of claim 9, wherein determining the score for each of the associated data sets comprises assigning, based on a number of data fields in common between the associated data set and the one or more query data fields, a weight to each of the associated data sets.

16. An apparatus comprising:
one or more processors; and
memory storing processor-executable instructions that, when executed by the one or more processors, cause the apparatus to:
extract a plurality of parameters from a plurality of chart data structures, wherein the plurality of chart data structures are generated based on a plurality of datasets associated with one or more queries and the plurality of parameters;
determine, based on the plurality of datasets, a field name and a data type for one or more data fields stored in one or more data tables in each respective dataset of the plurality of datasets;
determine a hash of the field name and the data type for each of the one or more data fields stored in the one or more data tables in each respective dataset of the plurality of datasets;
generate, based on the hash of the field name and the data type for each of the one or more data fields stored in the one or more data tables of each respective dataset, a result fingerprint; and
generate, based on the result fingerprint, a knowledge graph, wherein the knowledge graph facilitates identifying one or more datasets of the plurality of datasets comprising data fields that are most similar to one or more query data fields of one or more further queries associated with one or more parameters of the plurality of parameters.

17. The apparatus of claim 16, wherein the plurality of parameters comprises at least one of a dimension, a measure, an aggregation of dimensions or measures, or a pairing of dimensions or measures.

18. The apparatus of claim 16, wherein the processor-executable instructions further cause the apparatus to generate the plurality of chart data structures via one or more multidimensional cube data structures.

19. The apparatus of claim 16, wherein the processor-executable instructions that cause the apparatus to generate the knowledge graph further cause the apparatus to:
determine a plurality of nodes, wherein each node relates to a semantic concept; and
connect two or more of the plurality of nodes with one or more edges, wherein the one or more edges relate to relationships between the semantic concepts.

20. The apparatus of claim 19, wherein the semantic concepts and the relationships are pre-defined according to an ontology.

* * * * *